Feb. 2, 1971 P. V. N. HELLER 3,560,907

TEST CONNECTOR FOR MICROMINIATURE CIRCUITS

Filed May 17, 1968 3 Sheets-Sheet 1

INVENTOR
PETER V. N. HELLER
BY KENDRICK and SUBKOW
George J. Netter
ATTORNEYS

Feb. 2, 1971 P. V. N. HELLER 3,560,907

TEST CONNECTOR FOR MICROMINIATURE CIRCUITS

Filed May 17, 1968 3 Sheets-Sheet 2

INVENTOR
PETER V. N. HELLER
BY KENDRICK and SUBKOW
George J. Netter
ATTORNEYS

Feb. 2, 1971 P. V. N. HELLER 3,560,907

TEST CONNECTOR FOR MICROMINIATURE CIRCUITS

Filed May 17, 1968 3 Sheets-Sheet 3

INVENTOR
PETER V. N. HELLER
BY KENDRICK and SUBKOW
George J. Netter
ATTORNEYS

United States Patent Office
3,560,907
Patented Feb. 2, 1971

3,560,907
TEST CONNECTOR FOR MICROMINIATURE CIRCUITS

Peter V. N. Heller, Orange, Calif.
(213 Esplanade, San Clemente, Calif. 92672)

Filed May 17, 1968, Ser. No. 729,971
Int. Cl. H01r *13/24*
U.S. Cl. 339—17 11 Claims

ABSTRACT OF THE DISCLOSURE

A predetermined number of thin, spring-like, metallic connection members are received within slots in an annular insulative base. The major planes of the members are disposed normally to the plane of the annular base with the member edges each having a pointed end located in the opening of the base. The members are configured such that on moving the base toward a circuit to be tested sufficiently to bring the pointed members ends into contact with predetermined circuit points all resilient motion of the members is normal to the circuit.

The present invention pertains generally to electric circuit connection apparatus, and, more particularly, to such apparatus for effecting connections ot microminiature electrical and electronic circuits without disturbing the circuits physical connective aspects.

BACKGROUND OF THE INVENTION

The ever increasing trend is toward increasing miniaturization of of electrical and electronic circuits, accompanying which is the continuing problem of making effective electrical connections to such circuits without adversely affecting, or possibly destroying, the circuits. This problem becomes especially acute in manufacturing testing where it may be necessary to take circuit readings at a large number of different points, and, of course, leave the circuit unimpaired by the testing.

The magnitude of the microcircuit temporary connection problem is indicated by considering, say, a thin film circuit which is made up of components formed from films varying in thickness from as little as 50 angstroms to several thousands of angstroms and measuring perhaps 0.5 inch (or less) on a side. Such a circuit to be adequately tested might require taking voltage, current and wave shape readings at upwards of fifty different circuital points. It is clear that conventional solder or welded connections in this case would be totally unsatisfactory since in making such connections the circuit might be damaged.

Moreover, presently known techniques and devices utilizing spring impelled connectors or other pressure type connectors are not completely satisfactory in that either the circuit is deleteriously affected during test or the equipment required is not amenable for application to the testing of a large number of points in a relatively small area.

OBJECTS AND SUMMARY

It is a primary object of the present invention to provide a temporary electrical connector for making multiple point connections with a microminiature circuit.

Another object is the provision in a microminiature test connector of resilient contacting members which move substantially normally to the general plane of the circuit.

A further object is the provision of low contact pressure electrical connection to a microminiature circuit at a plurality of precisely located circuit points quickly, easily and without damaging the circuit even during high speed testing.

Yet another object is the provision of a connector for use with microminiature circuits having individual electrical contactors which can be replaced without magnification equipment and which contactors have repeatable spring contacting force.

A still further object is the provision of a connector as described in the above objects in which a slotted insulative holder receives the connector contacts therewithin disposing them in fixed relative orientation permitting repeated connection and disconnection while maintaining the same contacting relation to within a high degree of accuracy.

The above and other objects of the invention are achieved by providing an annular, insulative body having a prescribed number of transverse slots on one major surface. An equal number of relatively thin sheet-like connector contacts are received within corresponding slots of the insulative body. The inner ends of the contacts are pointed and extend through the annulus opening for contacting specific points of the circuit to which connection is made. A fixture locates the connector and circuit and confines motion of the connector with respect to the circuit to one of ninety degrees to the major circuit surface. The connector contacts each have an edge formed into a contact point, and when received within the respective slots of the insulative body contact pressure between the point and circuit produces a resilient reactive force in the plane of the connector contact. The slight amount of translation of the connector contact point during making and breaking connection with the circuit is substantially ninety degrees to the major circuit plane, thereby reducing "wiping" which can easily destroy deposited circuit elements.

Other objects and advantages of the present invention will be apparent to those skilled in the art on reference to the following description when taken with the accompanying drawings.

DESCRIPTION OF A PREFERRED EMBODIMENT

Figures 1, 2, 5:
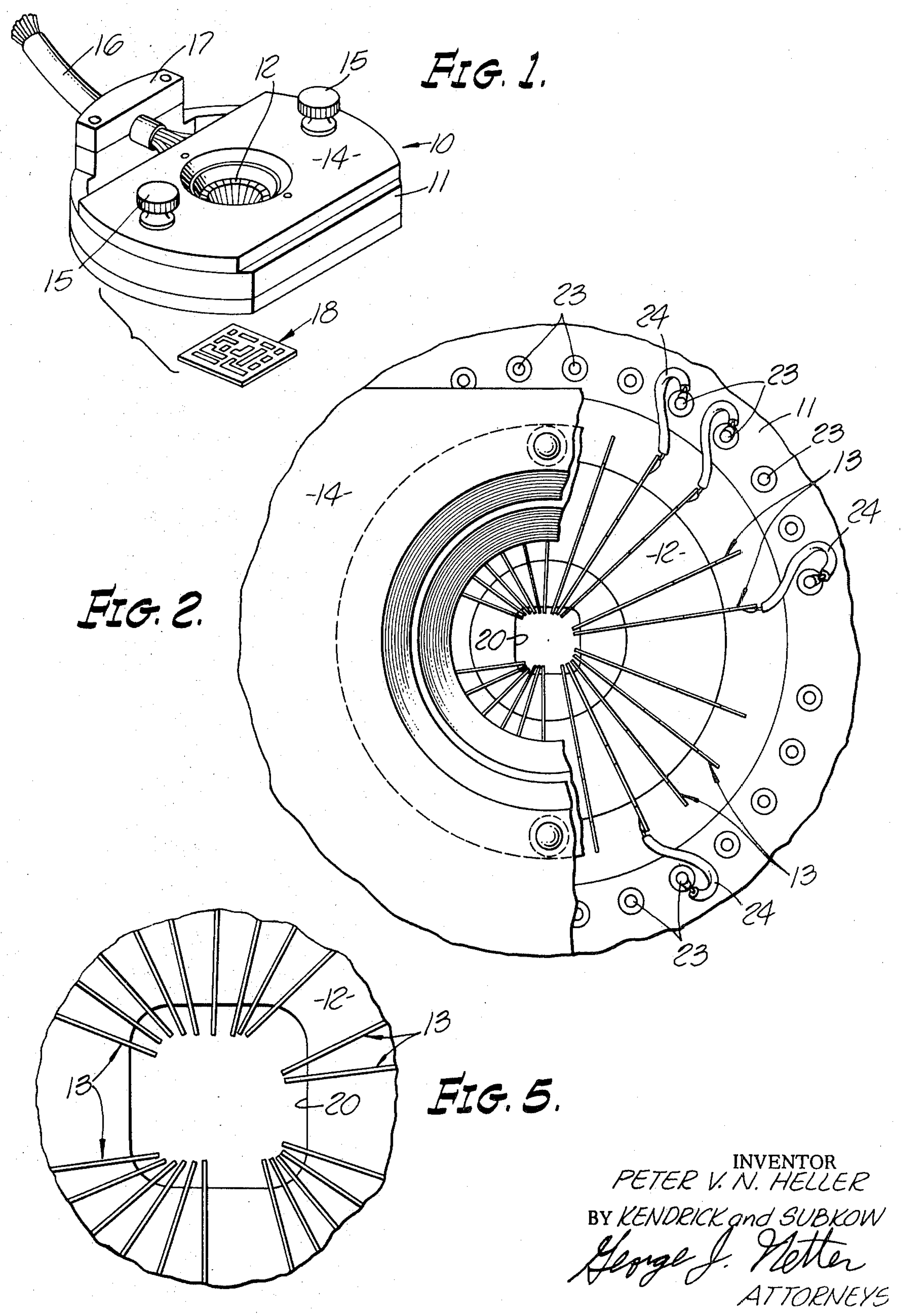
FIG. 1 is a perspective view of the connector of the invention illustrated adjacent a deposited microminiature circuit to which connection is to be made.
FIG. 2 is a plan, enlarged, partially fragmentary view of the connector of the invention.
FIG. 5 is a greatly enlarged, fragmentary depiction of the connector contacts making connection with appropriate circuit points of a microminiature circuit.

Turning first to FIG. 1, the connecteor of the invention is illustrated generally as at 10. An insulative enclosure 11 receives an annular insulative base 12 therewithin, which base is slotted to receive a corresponding plurality of connector contacts 13 of special configuration. A cover 14 secures the base 12 and connector contacts 13 in a fixed orientation within the enclosure through the instrumentality of threaded members 15. A cable 16 retained to the enclosure 11 by clamping means 17 interconnects external testing equipment, for example (not shown) to the connector contacts. In operation, the connector 10 is brought into predetermined relation with a microminiature circuit 18 such that each connector contact 13 resiliently and contactingly engages a prescribed point in the circuit, thereby permitting the conducting of tests or measuring circuit response by the external equipment.

Figure 3:
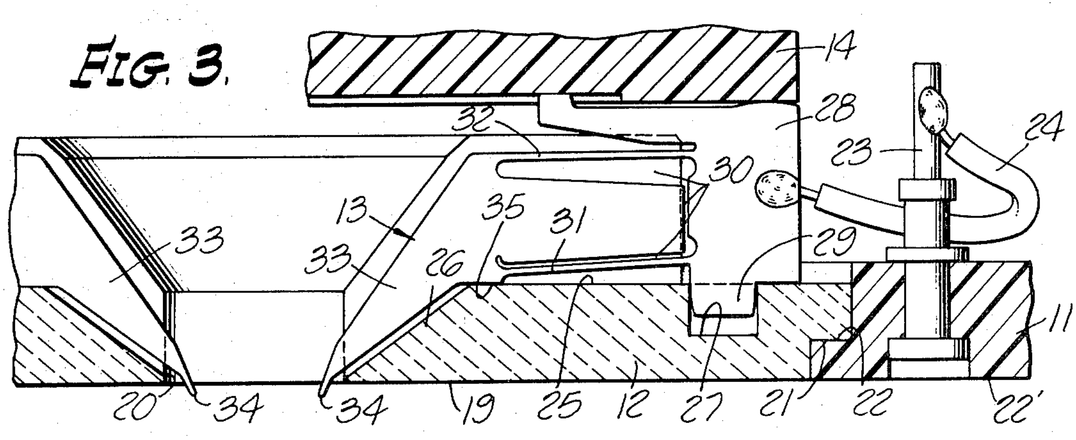
FIGS. 3 and 4 are sectional, partially fragmentary views showing the connector in disconnect and connect states, respectively.

Referring now simultaneously to FIGS. 2 and 3, the insulative base 12 is generally annular in shape with a lower flat surface 19 and a central opening 20 that is substantially square with rounded corners. The annular base includes a continuous recessed shoulder 21 along the outer edge of its lower surface which is received within a closely matching recessed shoulder 22 of the enclosure 11 disposing the enclosure lower surface 23 coextensive with the surface 19. The opening 20 increases in size on moving from the lower to the upper surface terminating at the upper surface in an opening several times the dimensions of that at the lower surface.

A plurality of terminal posts 23, one for each connector contact, are embedded within the enclosure body just outwardly of shoulder 22 and have upper parts from which connection to respective connector contacts are made via wires 24. By conventional means (not shown) the terminal posts are also connected to appropriate wires of the cable 16 and this way the connector contacts are electrically linked to the externally located testing equipment.

The annular base 12 is provided with slots extending from the base upper surface part way therethrough with the slot planes lying at ninety degrees to the major plane of the annular base. The bottom of the slots includes a flat central portion 25 that is parallel to the surface 19, a beveled portion 26 terminating at the opening 20, and a pocket 27 of generally rectangular cross-section.

The connector contacts 13 are constructed of relatively thin metallic sheet stock having excellent qualities of resiliency. A number of metals are satisfactory for this purpose, the best found to date being Phosphor bronze and beryllium-copper alloys.

Figure 4:
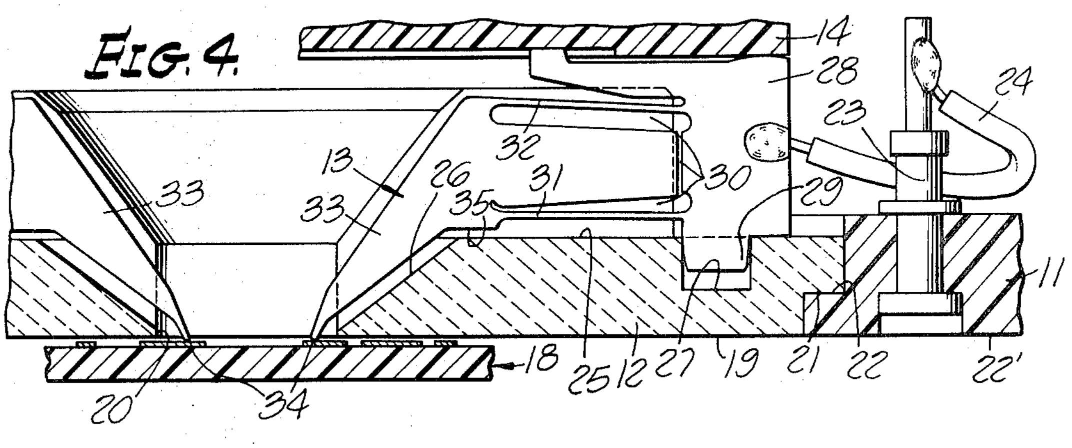

A first form of these connector contacts is that shown best in FIGS. 3 and 4, and is seen to include a generally L-shaped portion 28 having a lower extension 29 for receipt within the pocket 27. The upper portion, or leg, of the member 28 bears against the cover 14 when assembled. A U-shaped area 30 is removed from the contact blank leaving a pair of relatively thin flexure arms 31 and 32 extending away from the portion 28 in the same direction and link that member with an angularly downwardly generally triangular extension 33 that terminates in a circuit contacting point 34.

When the contacts 13 are mounted within the enclosure 11 and in the circuit disconnected state (FIG. 3), the lower edge 35 of the contact abuts against the surface 25. Also, at this time the point 34 extends outwardly of the opening 20 and beyond the plane of the surface 19.

Moreover, during the circuit-disconnect the cover or retaining ring 14 bears against the cross leg of the L-shaped portion 28 to preload the connector contact, in effect forcing the contact lower edge against the surface 25 as at 35.

When a microminiature circuit 18 is brought into operative engagement with the connector of the invention as illustrated in FIG. 4, the points 34 of the different connector contacts frictionally abut against predetermined regions of the circuit. In so doing, the extension 33 of each contact is raised away from the surface 26 of the annular base 12 and the linking members 31 and 32 are thereby stressed such that the point 34 of each contact 13 is resiliently urged against the circuit 18 insuring good electrical connection. Also, as a result of the particular construction of the connector contact 13, motion of the point 34 during connection and disconnection is substantially at 90 degrees to the upper plane surface of the circuit 18. This translation of the connector contact along a line normal to the circuit surface is important and advantageous in that wiping motion of the contact point against circuit elements, i.e., across or transversely of the circuit is kept optimally small, which would tend to abrade the circuit elements either deteriorating circuit performance or possibly destroying portions of the circuit.

Figure 6:
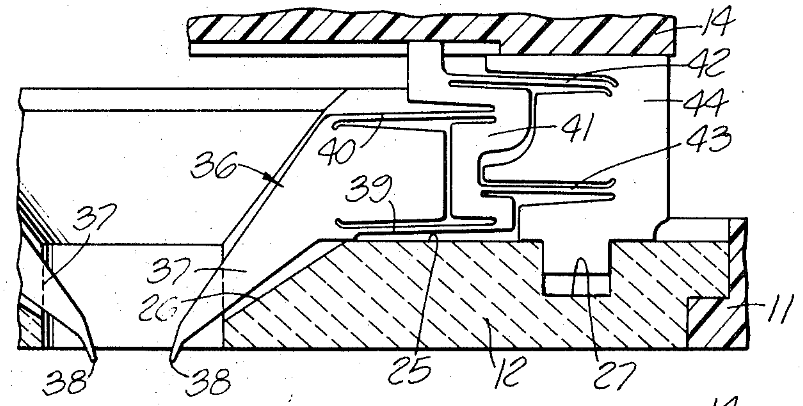
FIGS. 6 and 7 depict an alternate form of connector contact shown in the disconnect and connect states, respectively.
Figure 7:
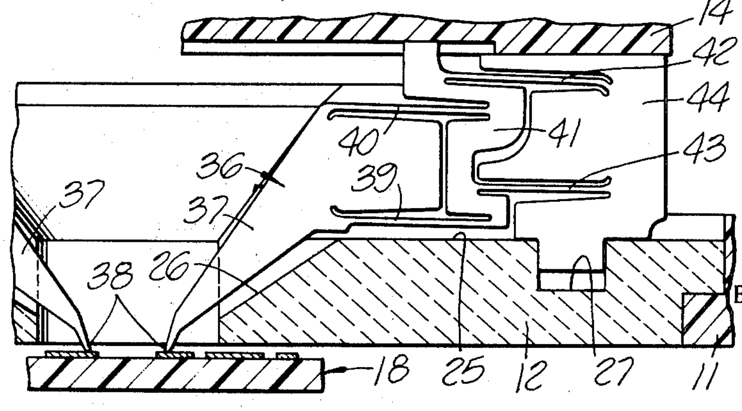

FIGS. 6 and 7 depict an alternate form of connector contact 36, the overall geometry of which is a cantilever spring system similar to that of contact 13, differing essentially in that preloading is more directly accomplished. More particularly, the contact 36 includes an extension 37 with circuit contacting point 38 that is substantially identical to that of the first described embodiment. The extension 37 is related via a pair of relatively thin flexure arms 39 and 40 to a generally S-shaped preloading member 41, the upper part which engages the lower surface of the retaining cover 14, while the lower part is spaced from the base 12. A further pair of flexure arms 42 and 43 extending generally parallel to flexures 39 and 40, interrelate the preloading member 41 to a support and terminal connection portion 44, the latter having its upper surface contacting the cover 14 while its lower surface is formed to fit into the groove 27.

When a circuit 18 is brought into operative engagement with a connector having connector contacts according to this further embodiment, the movement of the point 38 is at ninety degrees to the circuit plane with the motion being substantially entirely one of flexing of the arms 39 and 40. Flexing of arms 42 and 43 is almost completely during preloading.

It is important that each connector contact, either of the 13 or 36 embodiments, be precisely located with respect to the circuit 18, and maintain this precise construction throughout a large number of use cycles. This repeatability and assurance of correct positioning of the connector contacts depends, primarily, upon precise fabrication of the slots in the base 12 which receive the contacts as well as the ability of the material of which the annular base is constructed to withstand abrasion by the contacts.

Figures 10, 11:
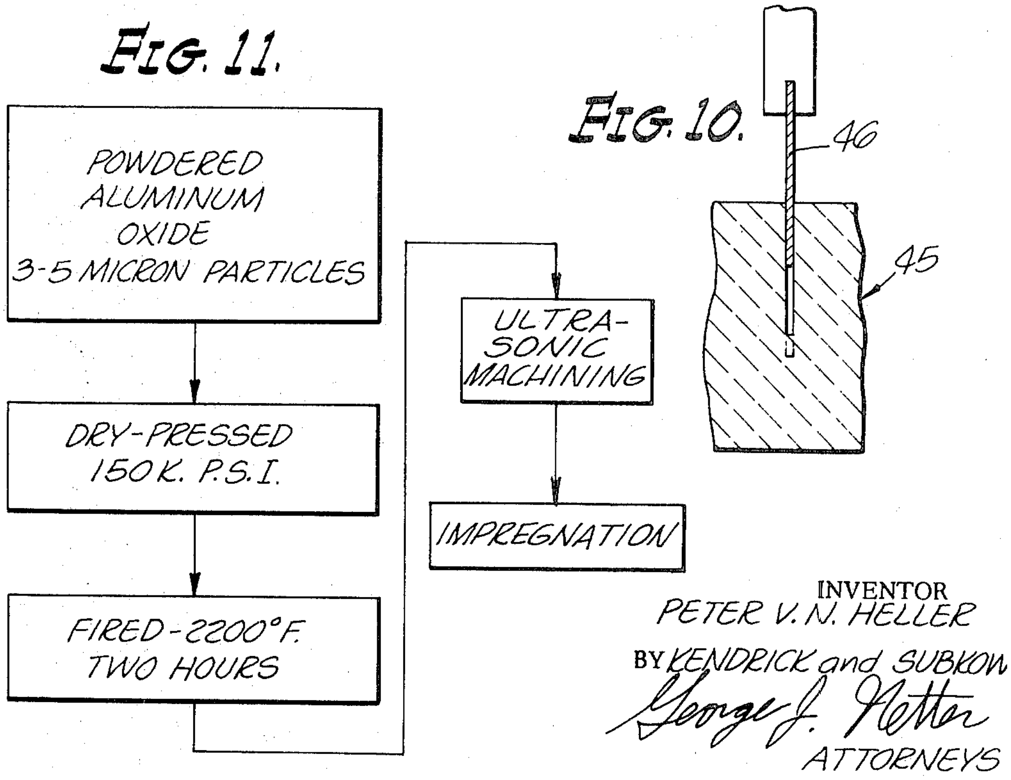
FIG. 10 is a sectional view taken along the line 10—10 of FIG. 9.
FIG. 11 is a flow diagram of the various process steps for making the annular insulative base.

Although other materials may be found satisfactory, to date the material which has been found to function best in this capacity is powdered aluminum oxide. More particularly, as is illustrated in FIG. 11, the base 12 is made by inserting powdered aluminum oxide having particles ranging from 3 to 5 microns into a suitably shaped mold. Next, the aluminum oxide is dry pressed at a pressure of 150 thousand pounds per square inch (K. p.s.i.) after which the material is fired at approximately 2200° F. for two hours.

Figures 8, 9:
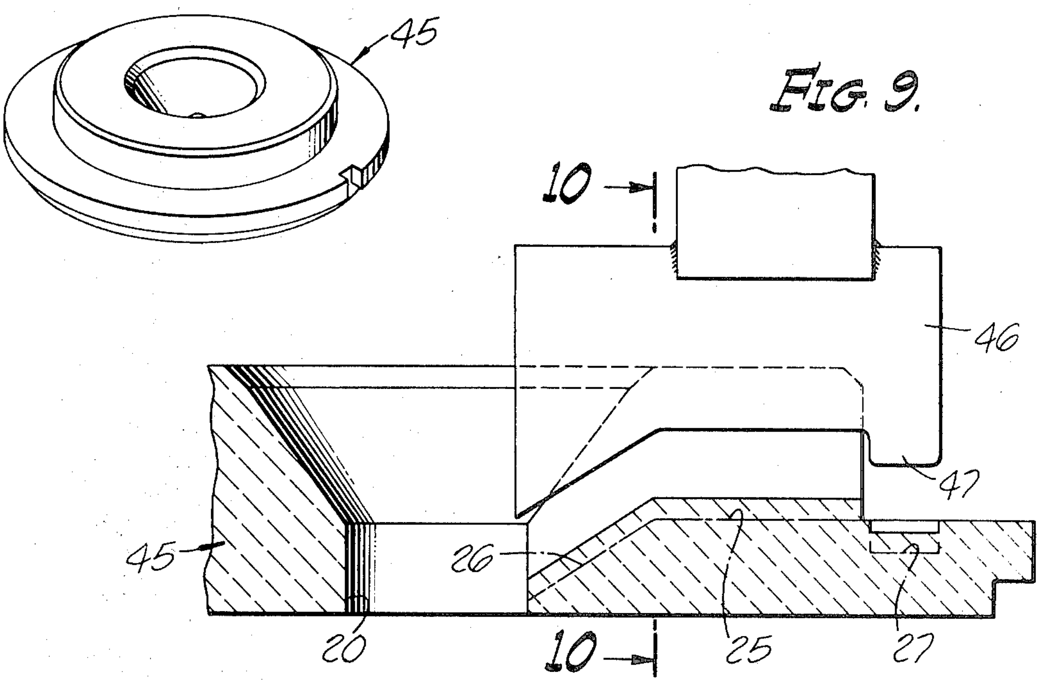
FIG. 8 is a perspective view of the insulative annular base of the invention prior to being slotted for receiving connector contacts.
FIG. 9 is a sectional, partially fragmentary view of the annular base of FIG. 8 illustrating one step in the process of its manufacture.

The fired blank 45 of FIG. 8 is most easily machined to include the required slots for the connector contacts by utilizing ultrasonic techniques. As shown in FIGS. 9 and 10, a tool 46 having a lower edge shape desired for the slots is attached to an ultrasonic transducer (not shown) to move the tool against the blank 45 in a direction normally to its upper surface, or in the direction shown by the arrows. The resulting machining action of the lower edge of the tool 46 produced by the ultrasonic motion forms the slot in the blank 45, and the portion 47 of the tool also forms the groove 27 at the same time. With the aforedescribed aluminum oxide base material and using a tool 46 of beryllium copper, reciprocation to the tool by the ultrasonic tranducer has been found to be optimum for this machining when in the range of 20–30 kilocycles per second.

The machine base 12, although dimensionally correct, is not sufficiently hard at this stage to withstand the forces (particularly abrasion from the contacts) to which it is subjected during normal use. To achieve the desired toughness, the machined base is vacuum impregnated with an epoxy resin, for example, with what is known as a B-stage epoxy. Finally, the impregnated base is heated to set up the epoxy, which, at the same time, is drawn into the material forming a hard stable body with excellent surface abrasion resistance. Other suitable materials for capillary impregnation of the base 12 are polyesters, acrylics, and the like, which can be introduced in a low viscosity form and thermally or catalytically hardened to increase compressive, tensile and abrasion resistance of the base.

The connector contacts themselves of both described embodiments can be formed by any prior art technique for handling sheet materials to form it into a predetermined configuration such as stamping, for example. However, in view of the relatively small sizes of the connector contacts required for use with the microminiature circuits, the best technique to date has been that of so-called photoetching, which, since it is a well known process, will not be described in detail. It has also been found advantageous to round off the contact points 34, 38 a slight amount, which can be satisfactorily accomplished by electrolytic polishing, for example.

There is provided in the practice of the present invention connector apparatus for use in making connection to so-called microminiature electrical and/or electronic circuits enabling the effecting of electrical connections to a plurality of different circuit points without adversely affecting the circuit. Although it is envisioned that a primary use of the invention would be in the testing area where only temporary connection is desired, it is within the spirit of the invention to use the described connector for more permanent connections.

Moreover, the test probe or connector of this invention is so constructed that in the case one, or more, of the connector contacts is damaged, it may be quickly and easily replaced. This replacement can be accomplished without magnification equipment and in a very short time. Still further, since each contact 13, 36 is substantially identical and has the same spring force, replacement does not require compensating location or spring force adjustments.

I claim:

1. In apparatus for making pressure electrical connections at a plurality of precisely located points on an exposed circuit lying in substantially a single plane, the improvement comprising:

an insulative substrate having an opening passing completely therethrough and a plurality of slots extending from one surface a limited extent into the substrate;

a corresponding plurality of sheet-like contacts of metallic spring material received edgewise within the slots and having edge portions extending into the substrate opening and outwardly thereof beyond an outer substrate surface; and cover means integrally maintaining the contacts and substrate together and prestressing the contacts;

said exposed circuit plane being located at the substrate opening such that the contact edge portions within the opening are resiliently urged substantially normally against respective portions of the circuit completing connection with collateral circuit apparatus.

2. In apparatus as in claim 1, in which a sheet-like contact includes a support portion engaging the bottom wall of the slot and the cover means, flexure means extending away from the support portion toward the substrate opening, and an extension member carried by the flexure means including said edge portions for contacting the circuit plane.

3. In apparatus as in claim 2, in which the sheet-like contact is constructed from a beryllium-copper blank.

4. In apparatus as in claim 1, in which the insulative substrate is constructed of compacted and fired aluminum oxide powder.

5. In apparatus as in claim 4, in which the substrate is constructed of molded aluminum oxide powder having a particle size of about 3–5 microns.

6. In apparatus as in claim 1, in which a sheet-ilke contact is generally elongate one end of which comprises a support that is frictionally secured between the cover means and slot bottom wall, the other end of which includes the circuit connecting edge portions, and a preloading member located between the ends and integrally related to said ends by flexure means, said preloading member contacting the cover so as to place the flexure means in stress and preloading the edge portions of said contacts.

7. In apparatus as in claim 2, in which electrical connection to each sheet-like contact is made by affixing a lead wire to the support portion.

8. An electrical contact, comprising:

a blade-like body member adapted to be supported at one end with its major plane at substantially 90 degrees to a circuit to which contact is to be made;

the other end of the member formed to have a generally pointed edge to serve as a contact point to be abutted against the circuit; and the central regions of said blade-like member having areas of the member material removed forming said member into a double cantilever such that pressure of the pointed end against the circuit produces translation of said pointed end substantially 90 degrees to the circuit.

9. An electrical contact as in claim 8 in which said blade-like member is constructed of beryllium-copper.

10. In apparatus for making pressure electrical connections at precisely located points on an exposed circuit plane, the improvement comprising:

an insulative substrate having a plurality of slots extending from one surface a limited extent into the substrate;

a corresponding plurality of sheet-like contacts of metallic spring material received edgewise within the slots and having edge portions extending beyond an outer substrate edge surface; and means integrally maintaining the contacts and substrate together and prestressing the contact;

said exposed circuit plane being located adjacent the substrate such that the contact edge portions are resiliently urged substantially normally against the respective portions of the circuit completing connection with collateral circuit apparatus.

11. In apparatus as defined in claim 10, in which said sheet-like contacts are of double cantilever construction.

References Cited

UNITED STATES PATENTS

| | | | |
|---|---|---|---|
| 3,270,311 | 8/1966 | Deer et al. | 339—176X |
| 3,414,869 | 12/1968 | Pascua | 339—193 |
| 3,422,394 | 1/1969 | Antes | 339—176 |
| 3,445,770 | 5/1969 | Harmon | 339—17X |

RICHARD E. MOORE, Primary Examiner

U.S. Cl. X.R.

339—176, 210, 252, 278